US009628720B2

(12) United States Patent
Deng et al.

(10) Patent No.: US 9,628,720 B2
(45) Date of Patent: Apr. 18, 2017

(54) SYSTEM AND METHOD TO CONTROL AN IMAGING PROCESS

(71) Applicant: QUALCOMM Incorporated, San Diego, CA (US)

(72) Inventors: Fan Deng, San Diego, CA (US); Ananthapadmanabhan Arasanipalai Kandhadai, San Diego, CA (US); Lei Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/824,901

(22) Filed: Aug. 12, 2015

(65) Prior Publication Data

US 2017/0048441 A1 Feb. 16, 2017

(51) Int. Cl.
 *H04N 5/232* (2006.01)
 *H04N 5/235* (2006.01)
 *H04N 5/225* (2006.01)

(52) U.S. Cl.
 CPC ......... *H04N 5/2353* (2013.01); *H04N 5/2327* (2013.01); *H04N 5/2351* (2013.01); *H04N 5/23216* (2013.01); *H04N 5/23254* (2013.01); *H04N 5/23264* (2013.01); *H04N 5/2256* (2013.01); *H04N 5/23212* (2013.01)

(58) Field of Classification Search
 CPC ........................... H04N 5/2353; H04N 5/2351
 See application file for complete search history.

(56) References Cited

U.S. PATENT DOCUMENTS

| 5,486,893 A * | 1/1996 | Takagi | G03B 7/0807 |
| | | | 396/147 |
| 2008/0013851 A1 | 1/2008 | Ishiwata et al. | |
| 2008/0204565 A1 | 8/2008 | Yumiki | |
| 2008/0260375 A1 | 10/2008 | Yumiki | |
| 2011/0285897 A1* | 11/2011 | Fujii | G03B 7/093 |
| | | | 348/345 |

(Continued)

FOREIGN PATENT DOCUMENTS

| JP | WO 9834400 A1 * | 8/1998 | ............. H04N 5/144 |
| WO | 9834400 | 8/1998 | |

OTHER PUBLICATIONS

International Search Report and Written Opinion—PCT/US2016/039100—ISA/EPO—Sep. 28, 2016.

*Primary Examiner* — Ahmed A Berhan
(74) *Attorney, Agent, or Firm* — Toler Law Group, PC

(57) ABSTRACT

An apparatus includes a processor and a memory. The memory stores instructions that when executed by the processor cause the processor to perform operations including receiving a command to perform an image capture of an image including an object. The operations further include determining a first speed threshold based on a first light condition at a first time. The operations further include determining a first speed of the object. The operations further include, in response to determining the first speed of the object exceeds the first speed threshold, determining a second speed threshold based on a second light condition detected at a second time. The operations further include determining a second speed of the object. The operations further include initiating the image capture of the image in response to determining the second speed of the object does not exceed the second speed threshold.

30 Claims, 7 Drawing Sheets

(56) References Cited

U.S. PATENT DOCUMENTS

2011/0299242 A1* 12/2011 Grantham .......... H05K 7/20745
  361/688
2013/0063605 A1   3/2013 Guan
2013/0120618 A1   5/2013 Wang et al.
2015/0002732 A1   1/2015 Hjelmstrom

* cited by examiner

SYSTEM AND METHOD TO CONTROL AN IMAGING PROCESS

I. FIELD

The present disclosure is generally related to controlling an imaging process

II. DESCRIPTION OF RELATED ART

A camera may capture an image by exposing an image sensor or film to light for a period of time known as an exposure time. Visual properties of the image may depend on a total amount of light received by the image sensor or the film during the exposure time. The total amount of light received by the image sensor or the film is a function of the length of the exposure time and one or more lighting conditions. For example, it may be desirable to use a relatively shorter exposure time in bright conditions or to use a relatively longer exposure time in dim conditions in order to expose the image sensor to a particular total amount of light. When an object that is a subject of the image moves, or moves more than a threshold amount, during the exposure time, the image may be distorted by an effect known as motion blur. Some cameras have a "sports mode" that may be manually turned on. When in sports mode, the camera may use an exposure time with a relatively low duration regardless of current lighting conditions in order to avoid motion blur. However, when sports mode is turned on, the camera may record images that are relatively underexposed (e.g., the image sensor may receive less than a particular target amount of light during the exposure time).

III. SUMMARY

In a particular embodiment, an apparatus includes a processor and a memory. The memory stores instructions that when executed by the processor cause the processor to perform operations including receiving a command to perform an image capture of an image including an object. The operations further include determining a first speed threshold based on a first light condition detected at a first time. The operations further include determining a first speed of the object. The operations further include, in response to determining that the first speed of the object exceeds the first speed threshold, determining a second speed threshold based on a second light condition detected at a second time. The operations further include determining a second speed of the object and initiating the image capture of the image in response to determining the second speed of the object does not exceed the second speed threshold.

In another particular embodiment, a method of initiating capture of an image is disclosed. The method includes receiving, at a processor, a command to perform an image capture of an image including an object. The method further includes determining a first speed threshold based on a first light condition detected at a first time. The method further includes determining a first speed of the object. The method further includes, in response to determining that the first speed of the object exceeds the first speed threshold, determining a second speed threshold based on a second light condition detected at a second time. The method further includes determining a second speed of the object and initiating the image capture of the image in response to determining the second speed of the object does not exceed the second speed threshold.

In another particular embodiment, a computer readable storage device stores instructions that, when executed by a processor, cause the processor to perform operations. The operations include receiving a command to perform an image capture of an image including an object. The operations further include determining a first speed threshold based on a first light condition at a first time. The operations further include determining a first speed of the object. The operations further include, in response to determining that the first speed of the object exceeds the first speed threshold, determining a second speed threshold based on a second light condition detected at a second time. The operations further include determining a second speed of the object and initiating the image capture of the image in response to determining the second speed of the object does not exceed the second speed threshold.

One particular advantage provided by at least one of the disclosed embodiments is that capture of an image including an object may be delayed until a speed of the object falls below a dynamically determined (e.g., recalculated at different times, such as at a first time and at a second time) threshold, which may enable capturing images with reduced motion blur.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
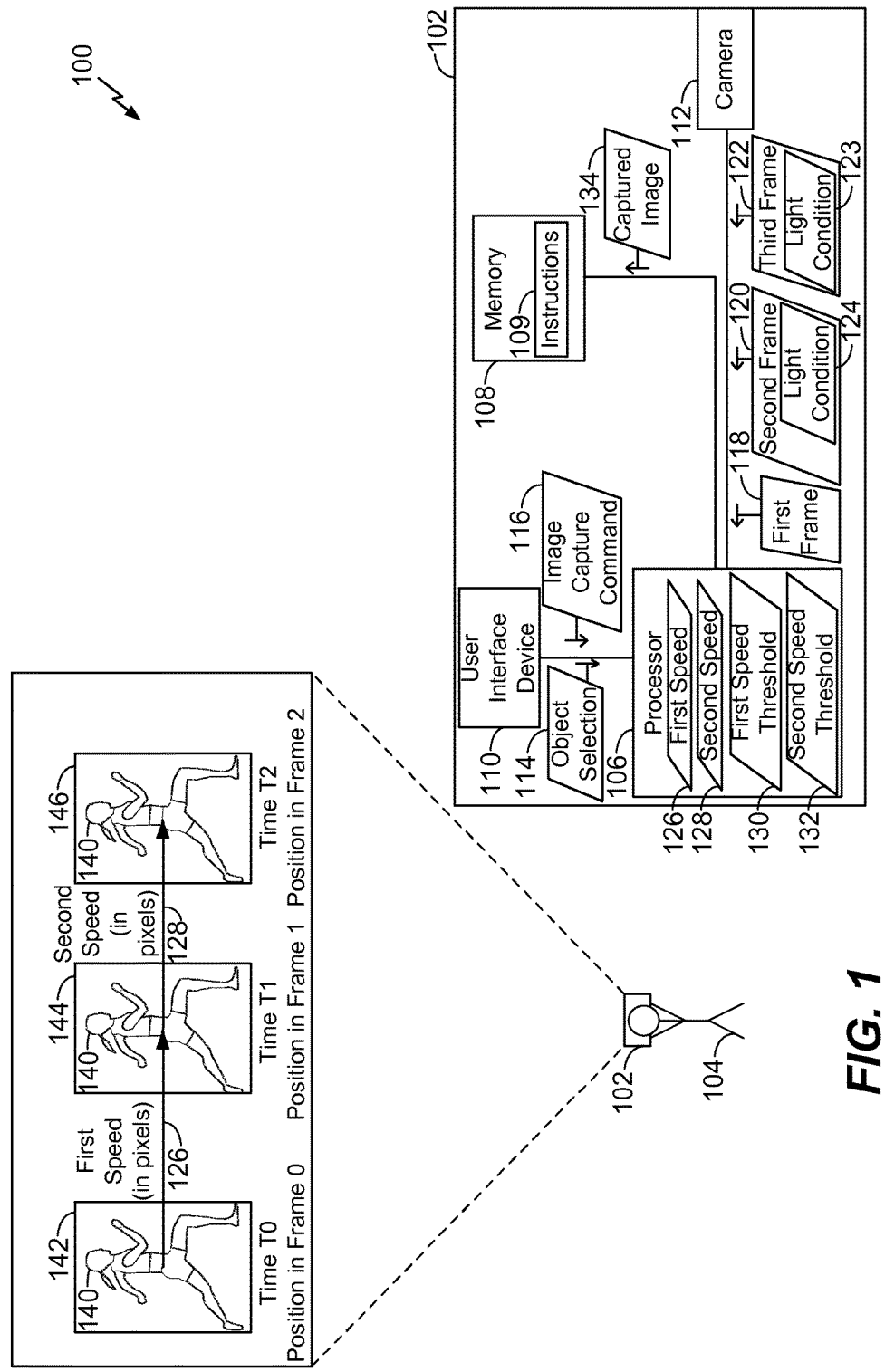
FIG. 1 is a diagram illustrating operation of a device configured to control an imaging process.

Referring to FIG. 1, a diagram 100 illustrating operation of a device 102 that is configured to control an imaging process is shown. When an object moves at a speed greater than a threshold speed during an image capture operation, a resulting captured image may have motion blur. The threshold speed may be based on an exposure time associated with image capture, and the exposure time may be based on one or more light conditions.

The device 102 may delay performing an image capture of an image of the object until a speed of the object falls below a speed threshold that is dynamically determined based on a detected light condition. Thus, the device 102 may enable capture of an image that includes relatively less motion blur while taking into account changing light conditions that may affect at what speed motion blur occurs. The device 102 may correspond to a computing device, such as a mobile phone, a tablet computer, a server, or any other computing device.

In the example illustrated in FIG. 1, the device 102 includes a user interface device 110, a memory 108, a processor 106, and a camera 112. In other examples, one or more of the user interface device 110, the memory 108, the processor 106, or the camera 112 may be distributed between more than one device rather than collocated in one device. For example, the device 102 may correspond to a server computer that is in communication with a second device that includes the camera 112. In some examples, the device 102 may include or may be in communication with a light sensor that is separate from the camera 112.

The user interface device 110 may include hardware configured to receive input from a user 104 and to output information to the user 104. For example, the user interface device 110 may include a touch screen interface, a display, buttons, a mouse, a keyboard, a monitor, any other input/output device, or a combination thereof.

The memory 108 may include a computer storage device, such as a hard disk drive, a solid state drive, random access memory, or any combination thereof. The processor 106 may include an image processor, a central processor unit (CPU), or a combination thereof. The processor 106 may be configured to execute instructions 109 stored at the memory 108 to perform operations, such as operations to control an imaging process. The operations may include controlling the camera 112 and capturing images to be stored in the memory 108. In alternate examples, the operations may include controlling a remote camera, causing captured images to be stored in a remote memory, or a combination thereof.

In operation, a user 104 may point the camera 112 toward one or more objects in order to capture an image of the object(s). The camera 112 may generate one or more frames to be displayed via the user interface device 110 (e.g., a display) so that a field of view of the camera is displayed. For example, the processor 106 may cause the camera 112 to generate the frames based on the instructions 109 in response to a command to launch a camera application. The device 102 may receive an object selection 114 via the user interface device 110. The object selection 114 may correspond to the user 104 selecting a particular object being displayed. For example, the object selection 114 may indicate an object 140. To illustrate, the object selection 114 may include a set of pixel coordinates of the first frame 118 that corresponds to (e.g., are located within) the object 140 in the first frame 118. The processor 106 may use the set of pixel coordinates and image processes such as feature detection, edge detection, blob detection, etc. to identify that that the object 140 has been selected. In the illustrated example, the object 140 is a person who is running. In a particular example, the object selection 114 may select a portion of a physical item, person, etc. To illustrate, the object selection 114 may select a head of the person who is running. As another illustrative example, the object selection 114 may select a windmill or a blade of a windmill rather than the whole windmill. After receiving the object selection 114, the processor 106 may initiate an object tracking mode based on the instructions 109. In the object tracking mode, the processor 106 may cause the camera 112 to generate a plurality of frames 118, 120, 122 of the object 140. Each of the frames 118, 120, 122 may be received at a different time. The plurality of frames 118, 120, 122 may be generated by the camera 112 using a particular frame rate. In some examples, the plurality of frames 118, 120, 122 are consecutively generated frames, but in other examples the plurality of frames 118, 120, and 122 may not be consecutively generated frames (e.g., other frames may be received between frames of the plurality of frames 118, 120, and 122). In the illustrated example, the plurality of frames includes three frames. In other examples, the plurality of frames may include more or fewer frames.

Based on the plurality of frames 118, 120, 122, the processor 106 may calculate various statistics and may control image capture functions based on the statistics. For example, the processor 106 may calculate a speed of the selected object as well as a speed threshold in response to one or more of the plurality of frames 118, 120, 122. The processor 106 may delay capture of an image of the selected object while the object moves faster than the speed threshold in order to avoid motion blur. In some examples, the processor 106 may calculate a new speed of the selected object and a new speed threshold for each frame or for each frame received after a first frame (e.g., because two frames may be needed to calculate a speed). The speed threshold may be calculated based on the camera 112 and based on one or more light conditions (e.g., illuminance). In some examples, the processor 106 may determine whether to enable image capture based on a content analysis of frames rather than the speed and the speed threshold (e.g., a speed analysis). The processor 106 may select between the content analysis and the speed analysis based on a focus position of an actuator of the camera 112. Determining whether to perform the content analysis or the speed analysis is described further below with reference to FIG. 2.

The one or more light conditions may be detected by the camera 112 or by a separate light sensor. For example, the processor 106 may be configured to detect the one or more light conditions based on the plurality of frames 118, 120, 122. A total amount of light exposed (e.g., an exposure value) to sensors in the camera 112 during generation of the frames 118, 120, 122 may be based on a light condition (e.g., illuminance) and an exposure time (e.g., how long the sensors of the camera 112 are exposed to the light). The exposure value may be based further on sensitivity of the sensors in the camera 112. A target exposure value may be set automatically by the processor 106 or in response to an exposure setting received at the processor (e.g., via the user interface device 110). In order to achieve the target exposure value, the processor 106 may determine an exposure time based on a detected light condition. To illustrate, the processor 106 may determine illuminance based on intensity values in pixels of the frames 118, 120, 122 and based on exposure times used to generate the frames 118, 120, 122. The processor 106 may then use a determined illuminance and the target exposure value to set an exposure time for one or more next frames. When an object moves during the exposure time, a motion blur may occur because light sensors may receive light reflected from the object as the object moves through different points in space. For example, a running person (e.g., the object 140) may move more than a threshold amount relative to the camera 112 while the camera 112 is generating a frame, resulting in the running person appearing blurred in the frame. Therefore, to improve the quality of a captured image 134, the processor 106 may determine a speed threshold at which motion blur may occur based on the exposure time. As explained above, the exposure time may be set based on a detected light condition in order to achieve the target exposure value. The processor 106 may change the exposure time based on changing light conditions detected in each of the plurality of frames 118, 120, 122 or detected by a separate light sensor. Accordingly, the processor 106 may compare a speed of the object 140 detected in each of the frames 118, 120, 122 to an updated speed threshold. The processor 106 may control image capture operations based on the detected object speed and the speed threshold.

For example, the processor 106 may receive the first frame 118 at a time T0 and the second frame 120 at a time T1 (e.g., a first time) after the time T0. The processor 106 may determine a first bounding box 142 around the object 140 in the first frame 118 and a second bounding box 144 around the object 140 in the second frame 120. The processor 106 may determine the bounding boxes 142, 144 by using object detection and recognition techniques to identify the object 140 and determining the bounding boxes 142, 144 as bounding boxes centered around the object 140. If the object 140 moves relative to the camera 112 within the image capture plane of the camera 112 between T0 and T1, the bounding boxes 142, 144 may have different positions in the image capture plane. The processor 106 may determine a first speed 126 of the object at the first time by determining a pixel difference between a first position of the object 140 in the first frame 118 and a second position of the object 140 in the second frame 120 (e.g., by determining a difference between coordinates of the first bounding box 142 and coordinates of the second bounding box 144). In the illustrated example, the first speed 126 corresponds to a distance between a midpoint of the first bounding box 142 and a midpoint of the second bounding box 144. By using the midpoint of the bounding boxes 142, 144 to determine the first speed 126, the processor 106 may ignore a change in size of the object 140 due to the object 140 moving toward or away from the camera 112 between T0 and T1. The first speed 126 may correspond to a speed the object 140 is moving in an image capture plane of the camera 112 (e.g., a plane perpendicular to an axis of a lens of the camera 112). The speed may thus be a number of pixels the object 140 has moved per frame. Alternatively, the speed may be a number of pixels the object 140 moves per second (e.g., the pixels moved per frame may be multiplied by a frame rate of the camera 112). The first speed 126 may be a speed (e.g., an average speed) of the object 140 relative to the camera 112 in between T1 and T0 (e.g., movement of the object 140, movement of the camera 112, or a combination thereof may contribute to the first speed 126).

The processor 106 may further determine a first speed threshold 130 based on a first light condition 124 detected in the second frame 120. For example, the processor 106 may determine the first light condition 124 by calculating ambient luminance based on the second frame 120. The processor 106 may determine a first exposure time based on the first light condition 124 and an exposure value. The exposure value may be set based on input received via the user interface device 110. In general, exposure value may be a function of exposure time and illuminance (e.g., exposure value=exposure time*illuminance), so the processor 106 may compute the first exposure time based on the exposure value and the first light condition 124. The memory 108 may store a function or a table that may be used to determine speed thresholds based on exposure times. The function or table may be set by a manufacturer of the camera 112 or may be determined by the processor 106 during a configuration or calibration mode. The processor 106 may determine the first speed threshold 130 at or subsequent to the time T1 (e.g., the first time) using the function or the table based on the first exposure time.

The processor 106 may receive an image capture command 116 via the user interface device 110 to capture an image of the object 140 (e.g., before or after T1). For example, the user 104 may press a shutter button (e.g., a physical button or a touch screen button) via the user interface device 110 to trigger the image capture command 116. Capturing an image 134 may correspond to saving one of the frames 118, 120, 122 as the captured image 134 or may correspond to sending a command to the camera 112 to generate a new image to be stored as the captured image 134. In response to the image capture command 116, the processor 106 may compare a recently determined speed of the object 140 (e.g., the first speed 126) with a most recently determined speed threshold (e.g., the first speed threshold 130). In response to determining that the first speed 126 exceeds the first speed threshold 130, the processor 106 may wait to initiate an image capture. That is, because the object 140 is moving too fast for a clear image capture given the first light condition 124 (and the exposure value), execution of the image capture command 116 may be delayed until the object 140 is determined to be moving at a speed less than or equal to a speed threshold. The object 140 may later be determined to be moving slower than a speed threshold because a speed of the object 140 has changed and/or because a new speed threshold has been calculated (e.g., because a light condition has changed, because the exposure value has been changed, or a combination thereof). For example, the processor 106 may determine to wait until the most recently determined speed of the object 140 falls below the most recently determined threshold to initiate the image capture. In addition or in the alternative, the processor 106 may wait or until a timeout period expires to initiate the image capture. In response to expiration of the timeout period, the processor 106 may initiate the image capture regardless of whether the image capture is enabled. In some examples, the processor 106 does not initiate the image capture in response to a timeout period. For example, the processor 106 may continue to wait for the most recently determined speed of the object 140 to fall below the most recently determined threshold. In some embodiments, rather than delaying image capture, the processor 106 may reduce the first exposure time to an exposure time corresponding to a speed threshold that is calculated based on a detected light condition and is greater than or equal to the most recently determined speed (e.g., the first speed 126) and initiate the image capture.

In embodiments in which the processor 106 waits to initiate the image capture, the processor 106 may calculate a new speed (e.g., a new most recently determined speed) and a new speed threshold (e.g., a dynamically determined speed threshold) for each frame received from the camera 112 that includes the tracked object 140. In these examples, the processor 106 may determine whether initiation of the image capture should be enabled based on each received frame. To illustrate, the processor 106 may receive the third frame 122 at a time T2 (e.g., a second time). Based on the third frame 122, the processor 106 may detect a second light condition 123. Alternatively, the processor 106 may receive the second light condition 123 from a separate light sensor. The second light condition 123 may be different than the first light condition 124. Based on the second light condition 123 and the previously determined exposure value, the processor 106 may determine a second exposure time. For example, a light source may have been activated or deactivated between the first time and the second time, or the object 140 may have moved into or out of a shaded area. In some examples, the processor 106 may decrease the exposure value automatically in response to determining that the image capture command 116 has been received and the processor 106 has not yet initiated the image capture. In some examples, the exposure value may be decreased every time a frame is received while the processor 106 is waiting to initiate the image capture. Since exposure value is a function of exposure time and a light condition (e.g., illuminance), the second exposure time may be determined based on the decreased exposure value.

The second exposure time may be used to determine a second speed threshold 132. In addition, the processor 106 may calculate a second speed 128 of the object 140 by comparing a position of the object 140 in the third frame 122 to the position of the object 140 in the second frame 120. For example, the processor 106 may calculate a difference between positions of a third bounding box 146 surrounding the object 140 in the third frame 122 and the second bounding box 144 surrounding the object 140 in the second frame 120. In the illustrated example, the second speed 128 corresponds to a difference between a position of a midpoint of the third bounding box 146 and the midpoint of the second bounding box 144. The second speed 128 may thus be in units of pixels per frame. In some examples, the second pixel speed 128 may be expressed in pixels per second (e.g., the pixels per frame may be multiplied by a frame rate of the camera 112 in the tracking mode). By using midpoints of the bounding boxes 144, 146 to determine the second speed 128, the processor 106 may ignore changes in size of the bounding boxes 144, 146 caused by the object 140 moving toward or away from the camera 112 between T1 and T2.

The processor 106 may compare the most recently determined speed of the object 140 (e.g., the second speed 128) to the most recently determined speed threshold (e.g., the second speed threshold 132). Upon determining that the most recently determined speed of the object 140 is less than the most recently determined speed threshold, the processor 106 may enable initiation of the image capture. Once initiation of the image capture has been enabled the processor 106 may initiate capture of the captured image 134. Performing the image capture may include saving (e.g., to the memory 108 or to a different memory) an earliest frame received from the camera 112 for which the image capture was enabled (e.g., the third frame 122) after the image capture command 116 was received as the captured image 134. Alternatively, the captured image 134 may correspond to a new frame (not shown) generated by the camera 112 in response to a command (not shown) from the processor 106.

Thus, FIG. 1 illustrates how a device may avoid motion blur in a captured image by waiting to initiate an image capture until a speed of an object no longer exceeds a speed threshold that may change (e.g., based on one or more lighting conditions). The device may increase accuracy of potential motion blur detection by periodically calculating a speed of the object and a speed threshold based on a detected light condition. Thus, the speed threshold used to avoid motion blur may be updated as an exposure time is updated based on changing lighting conditions.

Figure 2:
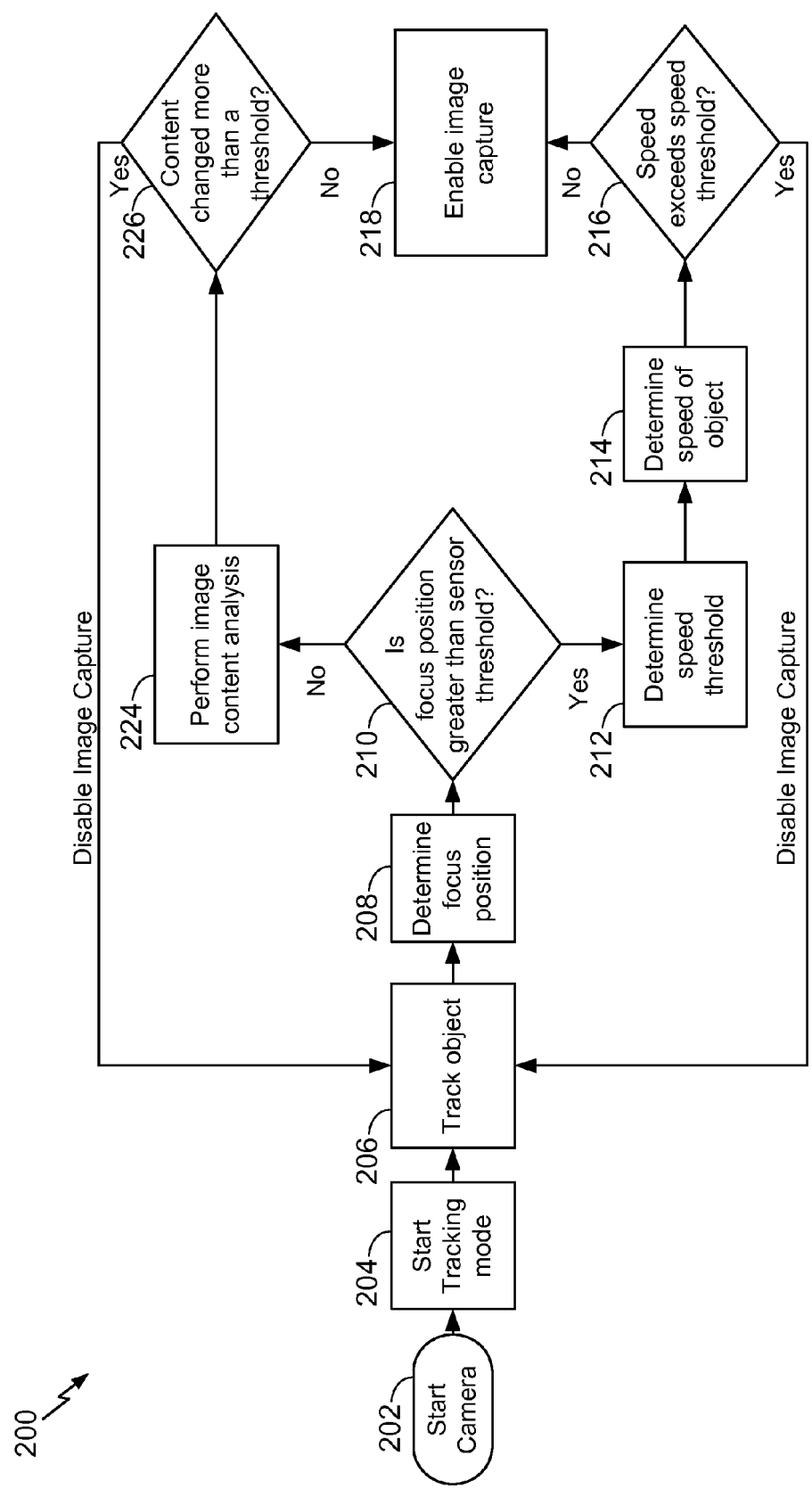
FIG. 2 is a flowchart illustrating a method of operating a device configured to control an imaging process.

Referring to FIG. 2, a flowchart illustrating a method 200 of operating a device, such as the device 102, is shown. The method 200 includes starting a camera, at 202. For example, the processor 106 may start the camera 112. In some examples, the processor 106 may start the camera 112 in response to a command received via the user interface device 110 to launch a camera application.

The method 200 further includes starting a tracking mode, at 204. For example, the processor 106 may initiate a tracking mode in response to receiving the object selection 114 (e.g., during execution of the camera application). In the tracking mode, the processor 106 may perform various tracking operations related to the selected object (e.g., the object 140) described below with reference to 206-226. The method 200 further includes tracking the selected object, at 206. For example, the processor 106 may direct the camera 112 to focus on the object 140 and to capture a frame (e.g., the first frame 118, the second frame 120, the third frame 122, etc.).

The method 200 further includes determining a focus position, at 208. For example, the processor 106 may determine a focus distance of the object 140 based on a status (e.g., a position) of one or more actuators of the camera 112. The method 200 further includes determining whether the focus position is greater than a sensor threshold, at 210. For example, the processor 106 may determine whether the object 140 is at least a threshold distance away from the camera 112 based on a status of one or more actuators of the camera 112, as described further below with reference to FIG. 4. In general, when the object 140 is within the sensor threshold, movement toward and away from the camera 112 may cause motion blur to occur because the camera 112 may change focus during an exposure time. Thus, an analysis that takes into account movement within the image capture plane as well as movement into and out of the image capture plane (e.g., a content analysis described below) may be useful in determining whether motion blur may occur. In contrast, movement toward and away from the camera 112 may be less likely to cause a motion blur when the object 140 is farther than the sensor threshold away from the camera 112. Thus, an analysis of a speed of the object 140 within the image capture plane may be more useful to determining whether motion blur is likely to occur when the object 140 is outside the sensor threshold.

The method 200 includes, in response to determining that the focus position is less than the sensor threshold, performing an image content analysis, at 224. For example, the processor 106 may determine whether the object 140 is moving (within a capture plane of the camera 112 and/or in-and-out of the capture plane) based on a content difference between a most recent frame (e.g., the second frame 120) and a previous frame (e.g., the first frame 118).

The method 200 further includes determining whether the content has changed (e.g., between two frames as described below) more than a threshold, at 226. When the content has not changed more than the threshold, the method 200 further includes determining to enable image capture, at 218. For example, in response to determining that a difference between content of the second frame 120 and the first frame 118 is less than a content change threshold, the processor 106 may enable image capture. If an image capture command (e.g., the image capture command 116) has been received, the processor 106 may store the second frame 120 (e.g., as the captured image 134) or may send a command to the camera 112 to generate a new frame to store as a captured image. In some examples, the method 200 returns to 206 after enabling image capture, at 218. When the content has changed by an amount greater than the content change threshold, the method 200 returns to 206. For example, in response to determining that the difference between the content of the second frame 120 and the first frame 118 exceeds the content change threshold, the processor 106 may disable image capture and receive a next frame (e.g., the third frame 122) from the camera 112. The content analysis, at 224, and the comparison, at 226, are described further below with reference to FIG. 3.

Returning to 210, in response to detecting that the focus position is greater than the sensor threshold, the method 200 further includes determining a speed threshold, at 212. For example, the processor 106 may determine the first speed threshold 130 at the first time T1 based on the first light condition 124 detected in the second frame 120 and based on the exposure value. The method 200 further includes determining a speed of the object, at 214. For example, the processor 106 may determine the first speed 126 of the object 140 by determining a difference (e.g., a number of pixels) between a position of the object 140 in the second frame 120 and a position of the object 140 in the first frame 118. Thus, the first speed 126 may be in units of pixels per frame. Alternatively, the processor 106 may multiply the difference by a frame rate of the camera 112 so that the first speed 126 is in units of pixels per unit of time (e.g., pixels per second). The method 200 further includes determining whether the speed exceeds the speed threshold, at 216.

The method 200 further includes in response to determining that the speed does not exceed the speed threshold enabling image capture, at 218. For example, the processor 106 may enable initiation of an image capture in response to determining that the first speed 126 does not exceed the first speed threshold 130. Image capture may correspond to saving a frame (e.g., one of the frames 118, 120, 122) as the captured image 134 in the memory 108 or in another memory. Alternatively, image capture may correspond to sending a command to the camera 112 to generate a new frame to save as the captured image 134. If the processor 106 receives the image capture command 116 while image capture is enabled, or if the processor 106 has received the image capture command 116 prior to enabling image capture, the processor 106 may initiate capture of an image. In some examples, the method 200 returns to 206 after enabling image capture, at 218. Returning to 216, in response to determining that the speed exceeds the speed threshold, the method 200 includes disabling image capture and tracking the object, at 206.

Thus, the method 200 illustrates a method of reducing or avoiding motion blur in a captured image by not enabling an image capture when a speed of a detected object is too great. In particular, the method 200 may increase accuracy of potential motion blur detection by recalculating a speed of the object and a speed threshold based on a detected light condition when the object is farther away than a sensor threshold.

Figure 3:
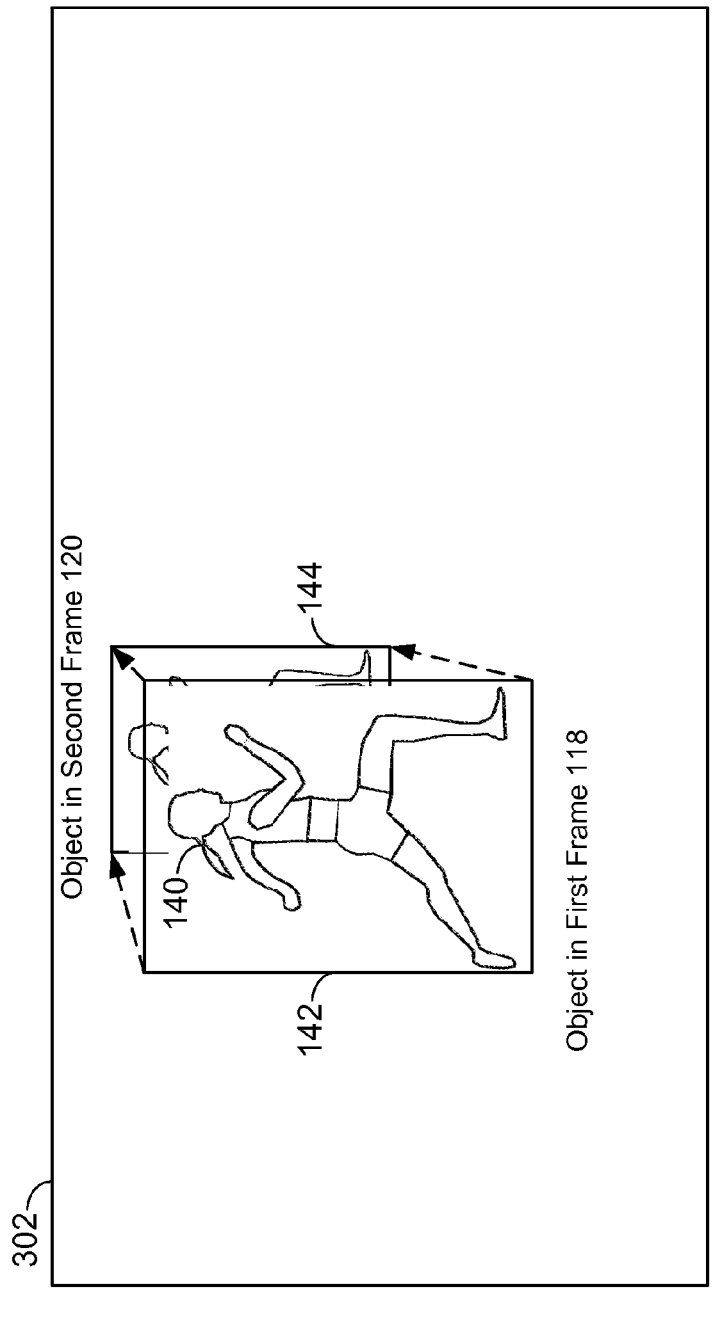
FIG. 3 is a diagram illustrating a content analysis that may be performed during control of an imaging process.

Referring to FIG. 3, a diagram 300 illustrating a content analysis is shown. The diagram 300 illustrates a field of view 302 of a camera, such as the camera 112. The field of view 302 may be included in frames displayed by a device, such as the device 102. During a content analysis of frames, such as the content analysis performed at 224 of the method 200 of FIG. 2, a processor (e.g., the processor 106) may crop the frames to bounding boxes surrounding a tracked object. For example, the processor may crop the first frame 118 to the first bounding box 142 around the object 140 in the first frame 110 and may crop the second frame 120 to the second bounding box 144 around the object 140 in the second frame 120. The processor may determine a difference between content of the first bounding box 142 and content of the second bounding box 144. Content of the bounding boxes 142, 144 may differ due to movement (e.g., within an image capture plane of the camera and in/out of the image capture plane) of the object 140 relative to the camera 112. For example, the second bounding box 144 may be smaller and include less content because the object 140 has moved away from the camera 112 (or a user has moved the camera 112 away from the object 140) in the time between T1 and T0. Additionally, orientation of the object 140 within the bounding boxes 142, 144 may differ due to movement of the object 140. Further, background elements within the first bounding box 142 may differ from background elements within the second bounding box 144 due to movement of the object 140 relative to the camera 112. The difference between the content of the first bounding box 142 and the content of the second bounding box 144 may be calculated by comparing dimensions of the bounding boxes 142, 144, values of pixels within the bounding boxes 142, 144, positions of the bounding boxes 142, 144 within the field of view 302, or a combination thereof. The difference, or an absolute value of the difference, may be compared to a difference threshold, as shown at 226. By comparing the content of the bounding boxes surrounding an object, a processor may detect movement of the object, either within a capture plane or in/out of the capture plane.

Figure 4:
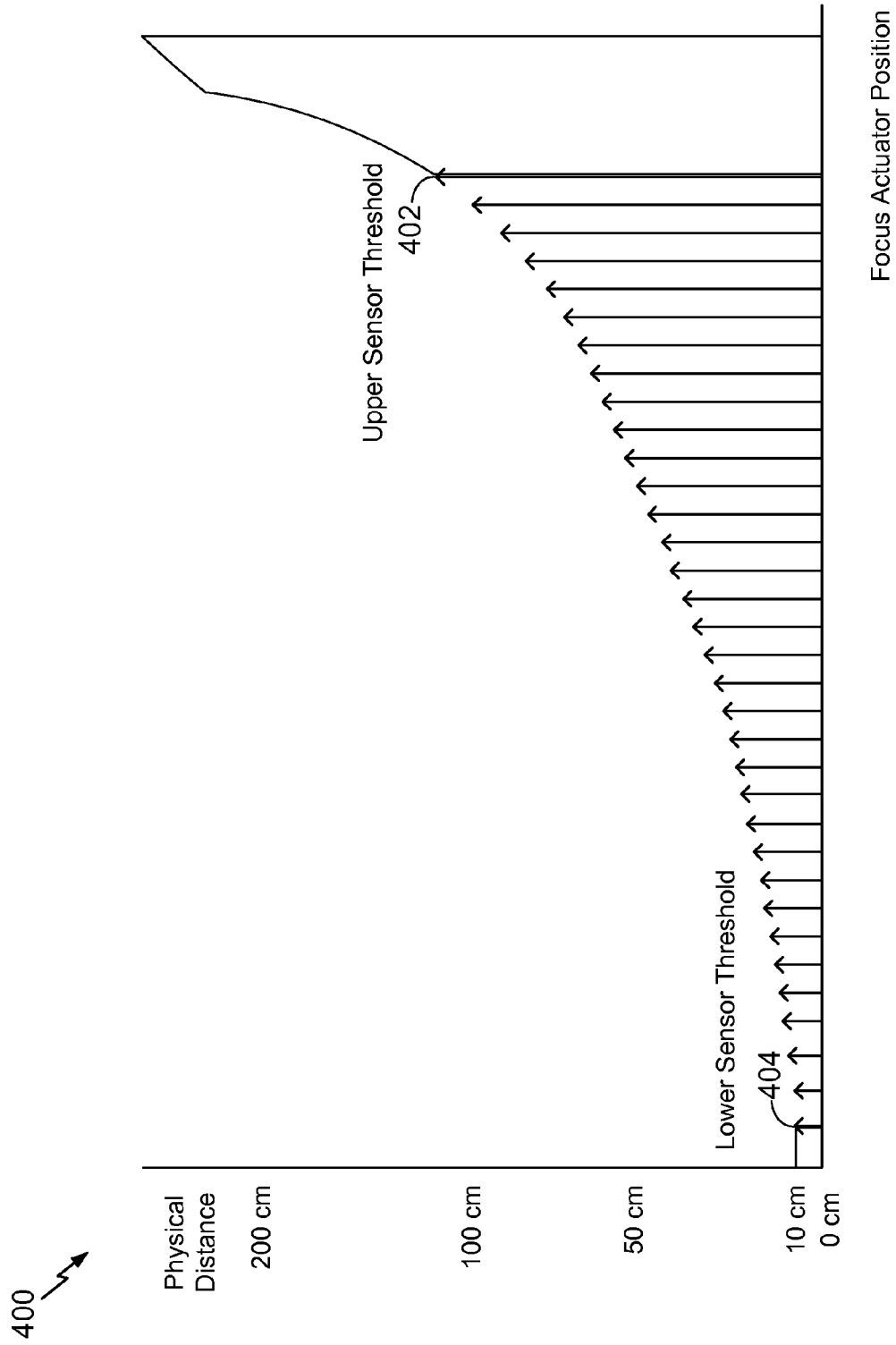
FIG. 4 is a graph illustrating a relationship between focus actuator position and physical distance that may be used to determine a sensor threshold that is usable to control of an imaging process.

Referring to FIG. 4, a graph 400 is shown illustrating a relationship between focus actuator position and physical distance to determine a sensor threshold that may be used at 210 of the method 200. The graph 400 illustrates different focus actuator positions of a camera (e.g., the camera 112) along the horizontal axis and corresponding distances of an object (e.g., the object 140) from the camera along a vertical axis. An upper sensor threshold 402 may correspond to a maximum actuator position of the camera and to the threshold referenced at 210 of the method 200 of FIG. 2. For example, in response to the processor 106 detecting that a focus actuator of the camera 112 is at the upper sensor threshold 402, the processor 106 may determine a speed threshold as shown at 212. In response to the processor 106 detecting that the focus actuator is below the upper sensor threshold 402, the processor 106 may perform the image content analysis as shown at 224. At distances less than the upper sensor threshold 402, movement of an object in/out of an image capture plane of the camera 112 may significantly impact likelihood of motion blur (e.g., because the camera 112 may adjust an actuator of the camera 112 to refocus the camera 112 during an exposure time). At distances greater than the upper sensor threshold 402, movement of an object in/out of an image capture plane of the camera 112 may impact the likelihood of motion blur less than motion within the image capture plane (e.g., because the actuator of the camera 112 may not refocus the camera 112 during the exposure time). Thus, the upper sensor threshold 402 may be used by the processor 106 to determine whether to begin the image content analysis, at 224, or to begin an analysis of speed within the image capture plane, at 212.

A lower sensor threshold 404 may correspond to a minimum actuator position of the camera 112. In some examples, the processor 106 may further determine whether the focus actuator is below the lower sensor threshold 404, at 210. In response to determining that the focus actuator is below the lower sensor threshold 404, the processor 106 may return to 206. In some examples, the processor 106 may enable image capture in response to determining that the focus actuator is below the sensor threshold 404 because movement of an object may not impact image quality (e.g., because the object may appear blurry in a captured image regardless of whether the object is moving when the object is so close to the camera 112). In other examples, the processor 106 may disable image capture in response to determining that the focus actuator is below the sensor threshold 404 because the object is so close to the camera 112 that a captured image would be blurry.

Thus, the graph 400 illustrates how sensor thresholds that may be used in determining whether to enable image capture (e.g., by the method 200). For example, the upper sensor threshold 402 may be used to determine whether the content analysis (beginning at 224) or the speed analysis (beginning at 212) is used to determine whether motion blur is likely to occur.

Figure 5:
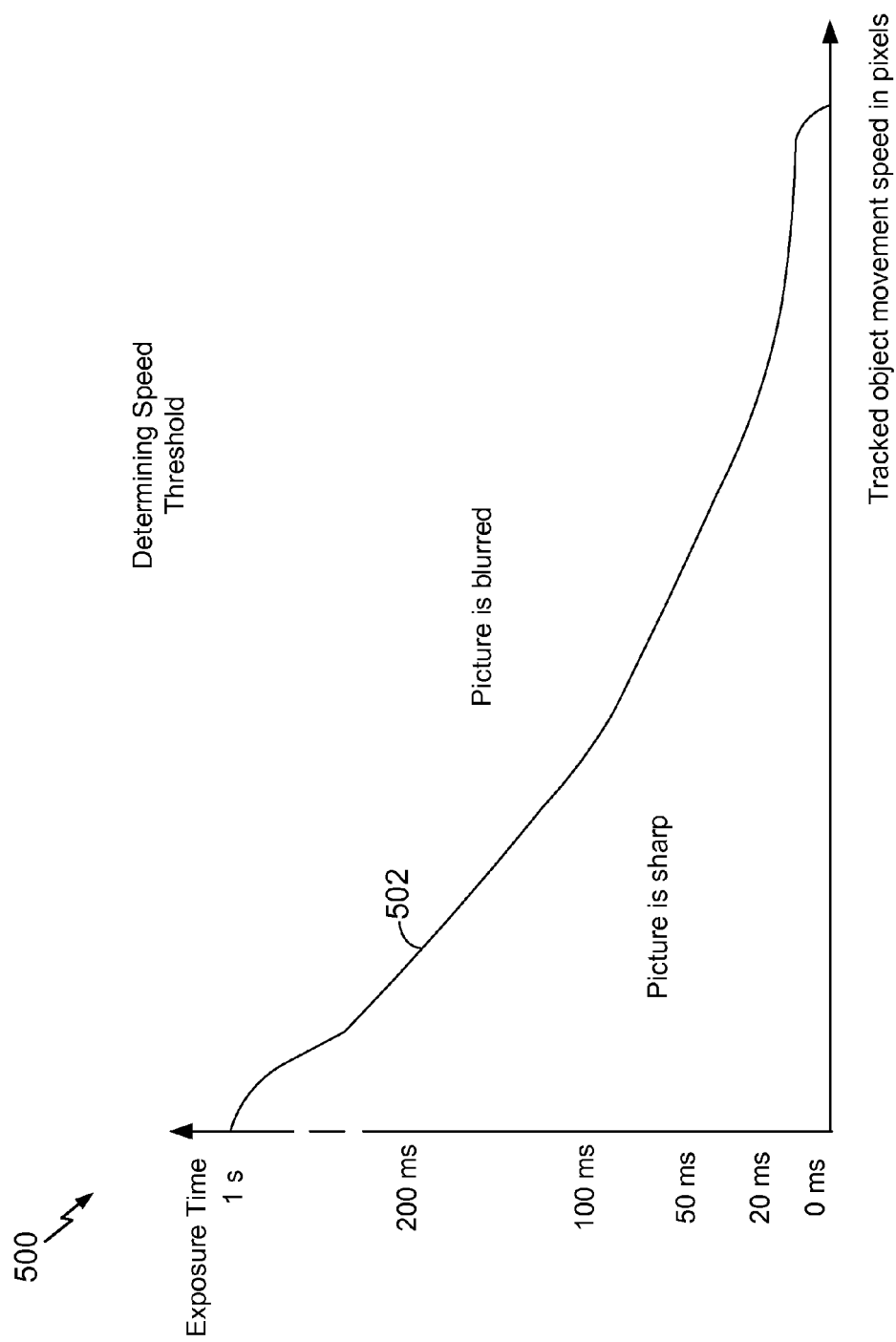
FIG. 5 is a graph illustrating speed thresholds that may be used during control of an imaging process.

Referring to FIG. 5, a graph 500 illustrating speeds at which movement within an image capture plane may cause motion blur is shown. The graph 500 illustrates object speeds along a horizontal axis and exposure times along a vertical axis. A line 502 delineates speed thresholds for various exposure times. Speeds that exceed the speed threshold for a particular exposure time may result in motion blur in an image. The speed thresholds illustrated by the line 502 may be stored as part of a table or may be determined based on a function stored in a memory (e.g., the memory 108). Since exposure time may be a function of a light condition and an exposure value, FIG. 5 illustrates how a speed threshold may be related to a light condition.

Figure 6:
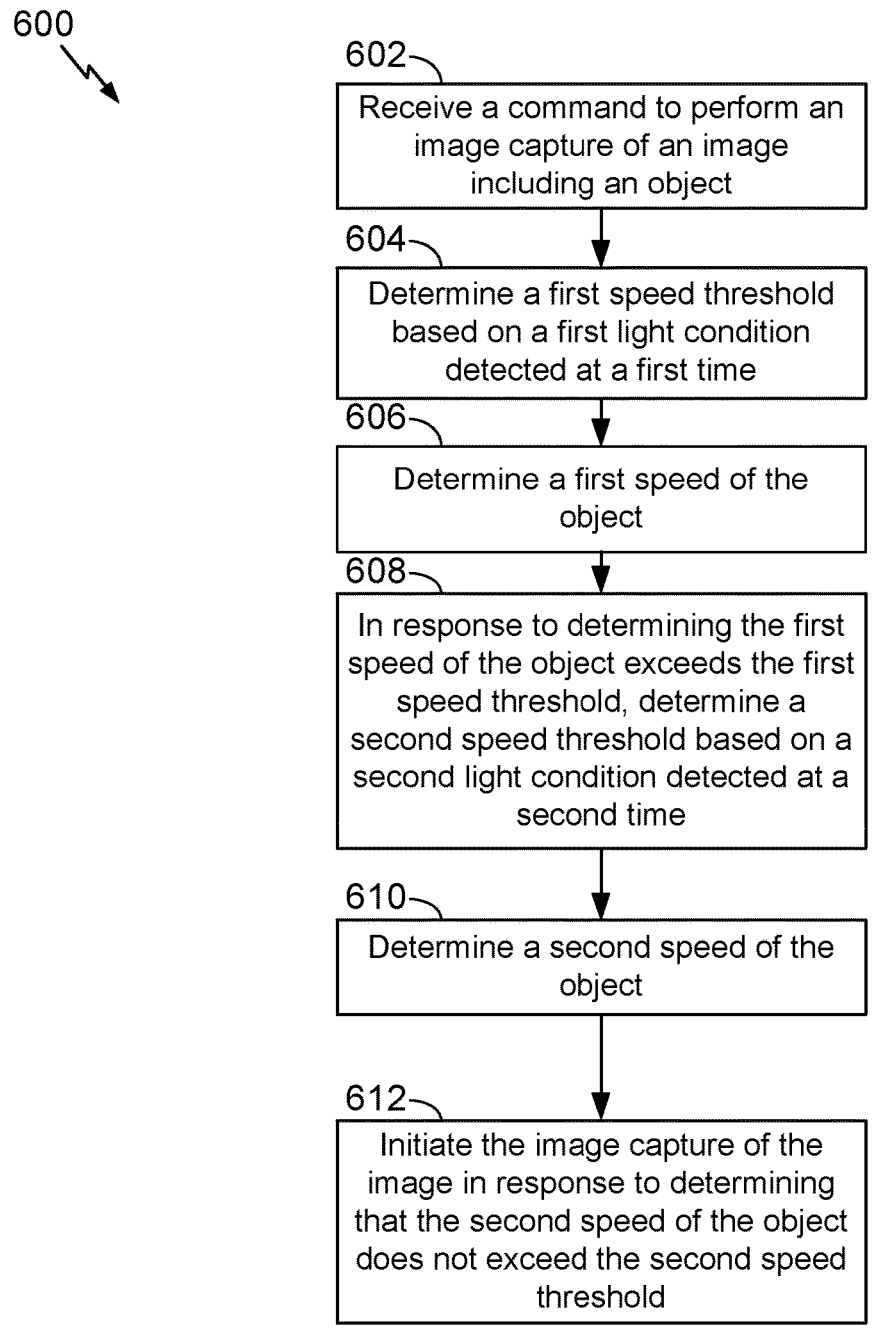
FIG. 6 is a flowchart illustrating a method of controlling an imaging process.

Referring to FIG. 6, a method 600 of controlling an imaging process is shown. The method 600 includes receiving a command to perform an image capture of an image including an object, at 602. For example, the processor 106 may receive the image capture command 116. The method 600 further includes determining a first speed threshold based on a first light condition detected at a first time, at 604. For example, the processor 106 may determine the first speed threshold 130 based on the first light condition 124 detected based on the second frame 120 at a first time. To illustrate, the first light condition 124 and the particular exposure value may be used by the processor 106 to calculate the first exposure time. As shown in FIG. 5, the first exposure time may be used to determine the first speed threshold 130.

The method 600 further includes determining a first speed of the object, at 606. For example, the processor 106 may determine the first speed 126 (e.g., a pixel speed) of the object 140 by comparing a position of the first object 140 in the second frame 120 to a position of the object 140 in the first frame 118. To illustrate, the position of the object 140 in the first frame 118 and the position of the object 140 in the second frame 120 may be determined by the processor 106 using object tracking and recognition techniques. In some examples, the processor 106 may determine the first bounding box 142 around the object 140 in the first frame 118 and the second bounding box 144 around the object 140 in the second frame 120. The position of the object 140 in the first frame 118 may correspond to a midpoint of the first bounding box 142, and the position of the object 140 in the second frame 120 may correspond to a midpoint of the second bounding box 144. The method 600 further includes, in response to determining that the first speed of the object exceeds the first speed threshold, determining a second speed threshold based on a second light condition detected at a second time, at 608. For example, in response to determining that the first speed 126 exceeds the first speed threshold 130, the processor 106 may disable image capture and may determine the second speed threshold 132 at the second time based on the second light condition 123 detected based on the third frame 122.

The method 600 further includes determining a second speed of the object, at 610. For example, the processor 106 may determine the second speed 128 of the object 140 by comparing a position of the object 140 in the third frame 122 to the position of the object 140 in the second frame 120. To illustrate, the position of the object 140 in the third frame 122 may be determined by the processor 106 using object tracking and recognition techniques. In some examples, the processor 106 may determine the third bounding box 146 around the object 140 in the third frame 122. The position of the object 140 in the third frame 146 may correspond to a midpoint of the third bounding box 146. The method 600 further includes initiating the image capture of the image in response to determining that the second speed of the object does not exceed the second speed threshold, at 612. For example, in response to determining that the second speed 128 does not exceed the second speed threshold 132, the processor 106 may enable image capture. In response to determining that the image capture command 116 has not been processed and that image capture is enabled, the processor 106 may initiate capture of an image. For example, the processor 106 may store the third frame 122 in the memory 108 or in a different storage device as the captured image 134. In addition or in the alternative, the processor 106 may send a command to the camera 112 to generate a new frame that may be stored at the memory 108 or at a different storage device as the captured image 134.

Thus, the method 600 may increase accuracy of potential motion blur detection by recalculating a speed of the object and a speed threshold based on a detected light condition. By using a recalculated speed threshold, the method 600 may take into account light conditions that change over time.

Figure 7:
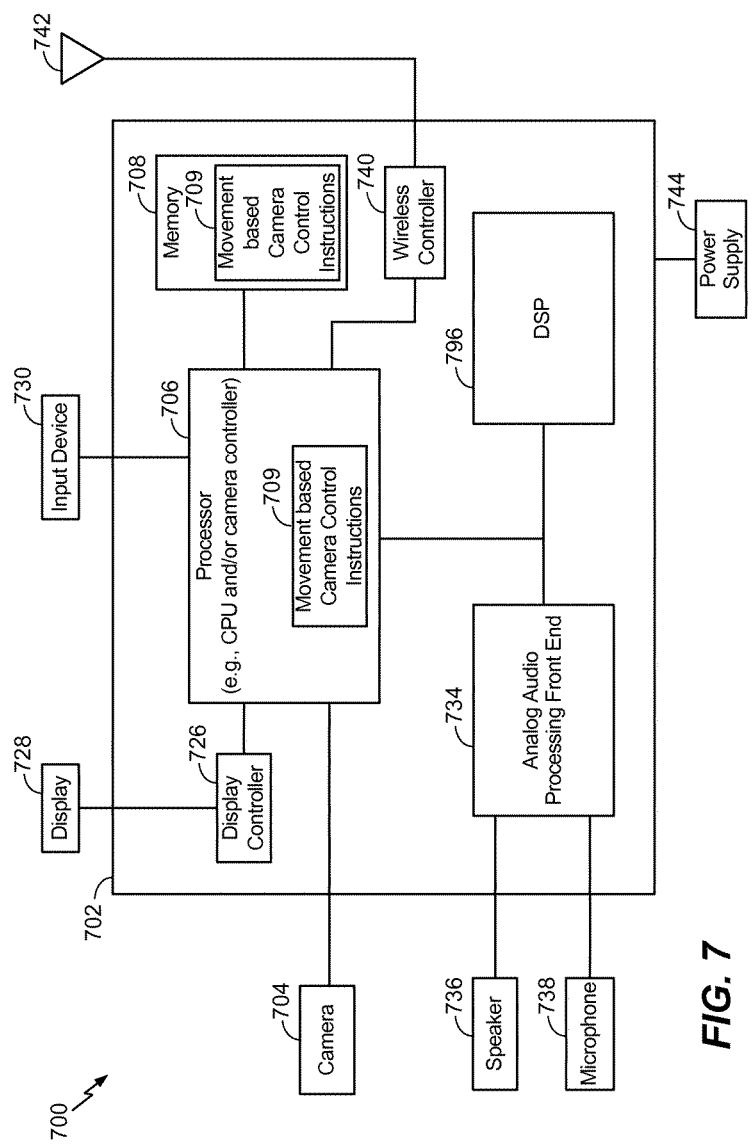
FIG. 7 is a block diagram of a device that may be used to control an imaging process.

Referring to FIG. 7, a particular illustrative implementation of an electronic device (e.g., a wireless communication device) 702 is depicted and generally designated 700. The device 700 includes a processor 706, such as a central processor unit (CPU) and/or a camera controller, coupled to a memory 708. In an illustrative example, the device 700, or components thereof, may correspond to the device 102 of FIG. 1, or components thereof. For example, the processor 706 of FIG. 7 may correspond to the processor 106 of FIG. 1.

The processor 706 may be configured to execute software (e.g., movement based camera control instructions 709) stored in the memory 708. The movement based camera control instructions 709 may correspond to the instructions 109 of FIG. 1 and may enable the processor 706 to perform functions described with reference to the diagram 100, the method 200, the method 600, or a combination thereof.

FIG. 7 further illustrates a wireless controller 740 (e.g., an Institute of Electrical and Electronics Engineers (IEEE) 802.11 compliant interface) that may be configured to operate in accordance with one or more wireless communication standards, including one or more IEEE 802.11 standards. In a particular implementation, the processor 706 may be configured to perform one or more operations or methods described with reference to FIGS. 1-6. For example, the processor 706 may be configured to initiate capture of an image including an object based on one or more comparisons to dynamically determined speed thresholds.

The wireless controller 740 may be coupled to the processor 706 and to an antenna 742. For example, the processor 706 may be coupled to the antenna 742 via the wireless controller 740, such that wireless signals received via the antenna 742 may be provided to the processor 706.

An analog audio processing front end 734 can also be coupled to the processor 706. A speaker 736 and a microphone 738 can be coupled to the analog audio processing front end 734.

A display controller 726 can be coupled to the processor 706 and to a display device 728. In some cases, the display device 728 may include a touchscreen display. In a particular implementation, the processor 706, the display controller 726, the memory 732, the analog audio processing front end 734, and the wireless interface 740 are included in a system-in-package or system-on-chip device 722. In a particular implementation, an input device 730 and a power supply 744 are coupled to the system-on-chip device 722. Moreover, in a particular implementation, as illustrated in FIG. 7, the display device 728, the input device 730, the speaker 736, the microphone 738, the antenna 742, and the power supply 744 are external to the system-on-chip device 722. However, each of the display device 728, the input device 730, the speaker 736, the microphone 738, the antenna 742, and the power supply 744 can be coupled to one or more components of the system-on-chip device 722, such as one or more interfaces or controllers. The display 728, the display controller 726, the input device 730, or a combination thereof may correspond to the user interface device 110 of FIG. 1.

The electronic device 702 may further include, or be in communication with, a camera 704. The camera 704 may correspond to the camera 112 of FIG. 1. The processor 706 may control operation of the camera 704 based on the movement based camera control instructions 709 as described with reference to FIGS. 1-6.

In conjunction with the described implementations, an apparatus includes means for receiving a command to perform an image capture of an image including an object. The apparatus further includes means for determining a first speed threshold based on a first light condition detected at a first time. The apparatus further includes means for determining a first speed of the object. The apparatus further includes means for, in response to determining the first speed of the object exceeds the first speed threshold, determining a second speed threshold based on a second light condition detected at a second time. The apparatus further includes means for determining a second speed of the object. The apparatus further includes means for performing the image capture of the image in response to determining the second speed of the object does not exceed the second speed threshold.

For example, the means for receiving a command may correspond to the user interface device 110, to the display controller 726, to the display 728, to input device 730, to the antenna 742, to the wireless controller 740, or to a combination thereof. The means for means for determining a first speed threshold based on a first light condition detected at a first time may correspond to the processor 106, to the processor 706, to the camera 112, to the camera 704, or to a combination thereof. The means for determining a first speed of the object may correspond to the processor 106, to the processor 706, to the camera 112, to the camera 704, or to a combination thereof. The means for, in response to determining the first speed of the object exceeds the first speed threshold, determining a second speed threshold based on a second light condition detected at a second time may correspond to the processor 106, to the processor 706, to the camera 112, to the camera 704, or to a combination thereof. The means for determining a second speed of the object may correspond to the processor 106, to the processor 706, to the camera 112, to the camera 704, or to a combination thereof. The means for performing the image capture of the image in response to determining the second speed of the object does not exceed the second speed threshold may correspond to the processor 106, to the processor 706, to the camera 112, to the camera 704, to the memory 108, to the memory 708, or to a combination thereof.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the examples disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these examples will be readily apparent to those skilled in the art, and the principles defined herein may be applied to other implementations without departing from the scope of the disclosure. Thus, the present disclosure is not intended to be limited to the examples shown herein but is to be accorded the widest scope possible consistent with the principles and novel features as defined by the following claims.

What is claimed is:

1. An apparatus comprising:
a processor; and
a memory storing instructions that when executed by the processor cause the processor to perform operations including:
receiving a command to perform a conditional image capture of an image including an object;
responsive to receiving the command to perform the conditional image capture:
determining a first object-speed threshold based on a first light condition detected at a first time;
after determining that a first speed of the object exceeds the first object-speed threshold, determining a second object-speed threshold based on a second light condition detected at a second time; and
performing the conditional image capture of the image in response to determining that a second speed of the object does not exceed the second object-speed threshold.

2. The apparatus of claim 1, further comprising a light sensor configured to detect the first light condition and the second light condition.

3. The apparatus of claim 2, wherein the light sensor is within a camera, and wherein the operations further comprise, in response to determining that the first speed of the object exceeds the first object-speed threshold, determining whether a third speed of the object exceeds a third object-speed threshold, wherein determining the second object-speed threshold is performed after determining that the third speed of the object exceeds the third object-speed threshold.

4. The apparatus of claim 1, wherein the operations further comprise calculating a first exposure time based on the first light condition, and wherein the first object-speed threshold is determined further based on the first exposure time.

5. The apparatus of claim 4, wherein the operations further comprise receiving an input indicating an exposure value, and wherein the first exposure time is calculated further based on the exposure value.

6. The apparatus of claim 4, wherein the memory is configured to store a table that maps exposure times to object-speed thresholds, and wherein the first object-speed threshold is determined based on an entry of the table corresponding to the first exposure time.

7. The apparatus of claim 1, further comprising a touch screen user interface.

8. The apparatus of claim 1, wherein the operations further include:
   receiving a plurality of image frames; and
   outputting the plurality of image frames to a display, wherein performing the conditional image capture of the image includes storing a particular frame of the image frames in a storage device.

9. The apparatus of claim 1, wherein the operations further include:
   receiving a selection of the object;
   determining the first speed of the object;
   determining that the first speed of the object exceeds the first object-speed threshold; and
   determining the second object-speed threshold in response to determining that the first speed of the object exceeds the first object-speed threshold.

10. The apparatus of claim 1, wherein the operations further comprise tracking the object in response to determining that the first speed of the object exceeds the first object-speed threshold, wherein performing the conditional image capture of the image is delayed until determination that a particular speed of the object does not exceed a corresponding object-speed threshold.

11. The apparatus of claim 1, further comprising:
    an antenna; and
    a transmitter coupled to the antenna and configured to transmit an encoded signal that represents the captured image.

12. The apparatus of claim 11, wherein the processor, the memory, the transmitter, and the antenna are integrated into a mobile device.

13. A method of initiating capture of an image, the method comprising:
    receiving, at a processor, a command to perform a conditional image capture of the image including an object;
    responsive to receiving the command to perform the conditional image capture:
      determining a first object-speed threshold based on a first light condition detected at a first time;
      after determining that a first speed of the object exceeds the first object-speed threshold, determining a second object-speed threshold based on a second light condition detected at a second time; and
      performing the conditional image capture of the image in response to determining that a second speed of the object does not exceed the second object-speed threshold.

14. The method of claim 13, wherein the first speed is determined based on a number of pixels between a first position of the object in a first image frame and a second position of the object in a second image frame.

15. The method of claim 13, further comprising receiving a plurality of image frames, wherein:
    the first speed of the object is calculated based on first detected positions of the object in a first image frame of the plurality of image frames and in a second image frame of the plurality of image frames;
    the first light condition is detected based on the second image frame;
    the second speed of the object is calculated based on second detected positions of the object in a third image frame of the plurality of image frames and in a fourth image frame of the plurality of image frames; and
    the second light condition is detected based on the fourth image frame.

16. The method of claim 13, further comprising calculating a first exposure time based on the first light condition and a received exposure value.

17. The method of claim 16, wherein the first object-speed threshold is calculated based on the first exposure time, and further comprising, in response to determining that the first speed of the object exceeds the first object-speed threshold, delaying performance of the conditional image capture of the image.

18. The method of claim 16, further comprising calculating a second exposure time based on the second light condition and based on a reduced exposure value that is less than the exposure value, wherein the second object-speed threshold is determined based on the second exposure time.

19. The method of claim 13, further comprising:
    receiving a plurality of image frames; and
    outputting the plurality of image frames to a display, wherein performing the conditional image capture of the image includes storing a particular frame of the image frames in a storage device.

20. The method of claim 13, wherein determining the first object-speed threshold, determining the second object-speed threshold, and performing the conditional image capture of the image are performed within a device that comprises a mobile device.

21. The method of claim 13, wherein the first object-speed threshold is determined in response to determining that a position of a focus actuator is at a threshold position, and wherein the position of the focus actuator is based on a distance to the object.

22. The method of claim 13, further comprising receiving a second command to perform a second conditional image capture of a second image including a second object, wherein the second image is conditionally captured based on one or more conditions, the one or more conditions including a timeout period expiring, a third speed of the second object at a third time being less than or equal to a third object-speed threshold, a fourth speed of the second object at a fourth time being less than or equal to a fourth object-speed threshold, or a combination thereof.

23. An apparatus comprising:
    means for receiving a command to perform a conditional image capture of an image including an object;
    means for determining, responsive to receiving the command to perform the conditional image capture, a first object-speed threshold based on a first light condition detected at a first time and a second object-speed threshold based on a second light condition detected at a second time; and means for performing the conditional image capture of the image in response to determining that a second speed of the object does not exceed the second object-speed threshold.

24. The apparatus of claim 23, further comprising means for detecting light conditions.

25. The apparatus of claim 24, wherein the means for detecting light conditions comprises a camera, and wherein the means for determining the first object-speed threshold and the second object-speed threshold comprises a processor.

26. The apparatus of claim 23, further comprising means for receiving user input.

27. The apparatus of claim 26, wherein the means for receiving user input is configured to receive a selection of the object, and wherein the means for receiving user input comprises a touch screen.

28. A non-transitory computer readable storage device storing instructions that, when executed by a processor, cause the processor to perform operations including:

receiving a command to perform a conditional image capture of an image including an object;

responsive to receiving the command to perform the conditional image capture:

determining a first object-speed threshold based on a first light condition detected at a first time;

after determining that a first speed of the object exceeds the first object-speed threshold, determining a second object-speed threshold based on a second light condition detected at a second time; and performing the conditional image capture of the image in response to determining that a second speed of the object does not exceed the second object-speed threshold.

29. The non-transitory computer readable storage device of claim 28, wherein the operations further include receiving a selection of the object and initiating a tracking mode in response to receiving the selection, and wherein determining that the first speed of the object exceeds the first object-speed threshold is performed responsive to the selection.

30. The non-transitory computer readable storage device of claim 28, wherein the operations further comprise calculating a first exposure time based on the first light condition and a received exposure value, and wherein the first object-speed threshold is determined based on the first exposure time.

* * * * *